US012636215B2

(12) United States Patent
Kim et al.

(10) Patent No.: US 12,636,215 B2
(45) Date of Patent: May 26, 2026

(54) WEARABLE SUIT

(71) Applicant: HYUNDAI MOBIS CO., LTD., Seoul (KR)

(72) Inventors: Young Min Kim, Osan-si (KR); Yong Seok Choi, Yongin-si (KR); Soong Do Lee, Gimpo-si (KR); Lae Hoon Jeong, Suwon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 724 days.

(21) Appl. No.: 17/732,921

(22) Filed: Apr. 29, 2022

(65) Prior Publication Data

US 2023/0293378 A1     Sep. 21, 2023

(30) Foreign Application Priority Data

Mar. 15, 2022     (KR) ........................ 10-2022-0032369

(51) Int. Cl.
A61H 1/02 (2006.01)
B25J 9/00 (2006.01)

(52) U.S. Cl.
CPC .......... *A61H 1/0274* (2013.01); *B25J 9/0006* (2013.01); *A61H 2201/1207* (2013.01); *A61H 2201/1614* (2013.01); *A61H 2201/1619* (2013.01); *A61H 2201/164* (2013.01); *A61H 2201/165* (2013.01)

(58) Field of Classification Search
CPC .. A61H 1/0274; A61H 1/0237; A61H 1/0255; A61H 1/0262; A61H 2201/165; A61H 2201/12; A61H 2201/1207; A61H 2201/1619; A61H 1/02–0292; B25J 9/0006; B25J 9/1085
See application file for complete search history.

(56) References Cited

U.S. PATENT DOCUMENTS 11,369,541 B2 *  6/2022  Weidner ............... A61H 1/0237
2019/0175975 A1 *  6/2019  Carriere ............. A63B 21/4043
(Continued)

FOREIGN PATENT DOCUMENTS

CN        107648017 A      2/2018
EP        3 378 606 A1     9/2018
(Continued)

OTHER PUBLICATIONS

Extended European search report issued on Nov. 25, 2022, in counterpart European Patent Application No. 22176270.1 (7 pages in English).
(Continued)

*Primary Examiner* — Rachel T Sippel
*Assistant Examiner* — Gwynneth L Howell
(74) *Attorney, Agent, or Firm* — NSIP Law

(57) ABSTRACT

A wearable suit configured to assist muscular strength of a user, the wearable suit comprising: a body unit; a fixing unit configured to fix the body unit to an upper body of the user; an arm coupling unit coupled to at least a portion of an arm of the user; and an arm connecting unit configured to connect the body unit and the arm coupling unit to each other. The body unit comprises a housing defining an accommodating space therein; and a muscular strength assistance unit disposed inside the housing and comprising at least a portion comprised of a shape memory alloy material.

13 Claims, 14 Drawing Sheets

(56)                    References Cited

U.S. PATENT DOCUMENTS

| | | | |
|---|---|---|---|
| 2019/0274862 A1* | 9/2019 | Weidner ................... | A61F 5/02 |
| 2021/0045954 A1* | 2/2021 | Jang ....................... | B25J 9/1075 |
| 2022/0213875 A1* | 7/2022 | Park ....................... | A61H 11/00 |

FOREIGN PATENT DOCUMENTS

| | | |
|---|---|---|
| JP | 2020-55685 A | 4/2020 |
| KR | 10-2016-0104954 | 9/2016 |
| KR | 10-2021-0153910 A | 12/2021 |
| WO | WO 2021/118185 A2 | 6/2021 |

OTHER PUBLICATIONS

Korean Office Action issued on Feb. 20, 2024, in counterpart Korean Patent Application No. 10-2022-0032369 (4 pages in English, 6 pages in Korean).
Chinese Office Action issued on Apr. 30, 2025, in counterpart Chinese Patent Application No. 02210690973.7 (7 pages in English, 7 pages in Chinese).

* cited by examiner

WEARABLE SUIT

CROSS-REFERENCE TO RELATED APPLICATION

This application claims priority to and the benefit of Korean Patent Application No. 10-2022-0032369, filed on Mar. 15, 2022, the disclosure of which is incorporated herein by reference in its entirety.

TECHNICAL FIELD

The present disclosure relates to a wearable suit.

BACKGROUND

The content described here merely provides background information for the present disclosure and does not constitute the prior art.

A wearable robot and a wearable suit (hereinafter collectively a "wearable suit") refer to a type of robot that is worn on a human body. A user is directly in charge of posture control, context-awareness, and motion signal generation, which artificial intelligence of the robot is responsible for, and the wearable suit responds to various situations to assist muscular strength and mobility of the user or the like.

With the development of sensors, control, and software technologies, the wearable suits are being used in various fields such as military use, disaster relief, industrial work, rehabilitation treatment, and daily life assistance. The wearable suit can increase a work performance time and a work range of the user by assisting physical ability of the user in environments such as disaster sites and mountainous terrain. The wearable suit may be used for work and rehabilitation treatment by assisting the muscular strength and physical defects of the user in daily life.

The wearable suit may be divided into a passive type suit and an active type suit according to a power implementation method. Here, the passive type means a method using a preset force such as a spring and an elastic band, and the active type means a method using a variable force such as a motor and hydraulic pressure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a wearable suit configured to assist muscular strength of a user, the wearable suit comprising: a body unit; a fixing unit configured to fix the body unit to an upper body of the user; an arm coupling unit coupled to at least a portion of an arm of the user; and an arm connecting unit configured to connect the body unit and the arm coupling unit to each other, wherein the body unit comprises a housing defining an accommodating space therein; and a muscular strength assistance unit disposed inside the housing and comprising at least a portion comprised of a shape memory alloy material.

The wearable suit may include a guiding unit configured to guide a position of the arm connecting unit.

The guiding unit may include at least one guiding member to accommodate at least a portion of the arm connecting unit.

The at least one guiding member may include a first guiding member including one side connected to the housing and disposed such that at least a portion of the arm connecting unit is inserted.

In a state in which the user wears the wearable suit, one portion of the first guiding member may extend in a direction toward an upper side of the user from the housing, and a remaining portion of the first guiding member may extend in a direction from the one portion of the first guiding member toward a front of the user.

The at least one guiding member may include a second guiding member including at least a portion coupled to the fixing unit and disposed such that at least a portion of the arm connecting unit is inserted.

The second guiding member may be integral with at least a portion of the fixing unit.

At least a portion of the at least one guiding member may be curved.

The wearable suit may include: a leg coupling unit coupled to at least a portion of a leg of the user; and a leg connecting unit configured to connect the body unit and the leg coupling unit to each other.

The fixing unit may include one or more of a shoulder belt, a chest belt, a waist belt, and a leg belt.

The fixing unit may be vest shaped.

The muscular strength assistance unit may include at least one muscular strength assistance spring, and the at least one muscular strength assistance spring may be formed of a shape memory alloy material.

The muscular strength assistance unit may include two or more muscular strength assistance springs and the muscular strength assistant springs may be disposed in at least one form of series and parallel.

The wearable suit may include a power supply unit configured to supply power to the muscular strength assistance unit, and at least a portion of the muscular strength assistance unit may be expanded and contracted based on the power.

Other features and aspects will be apparent from the following detailed description, the drawings, and the claims.

REFERENCE NUMERICALS

Figure 1:
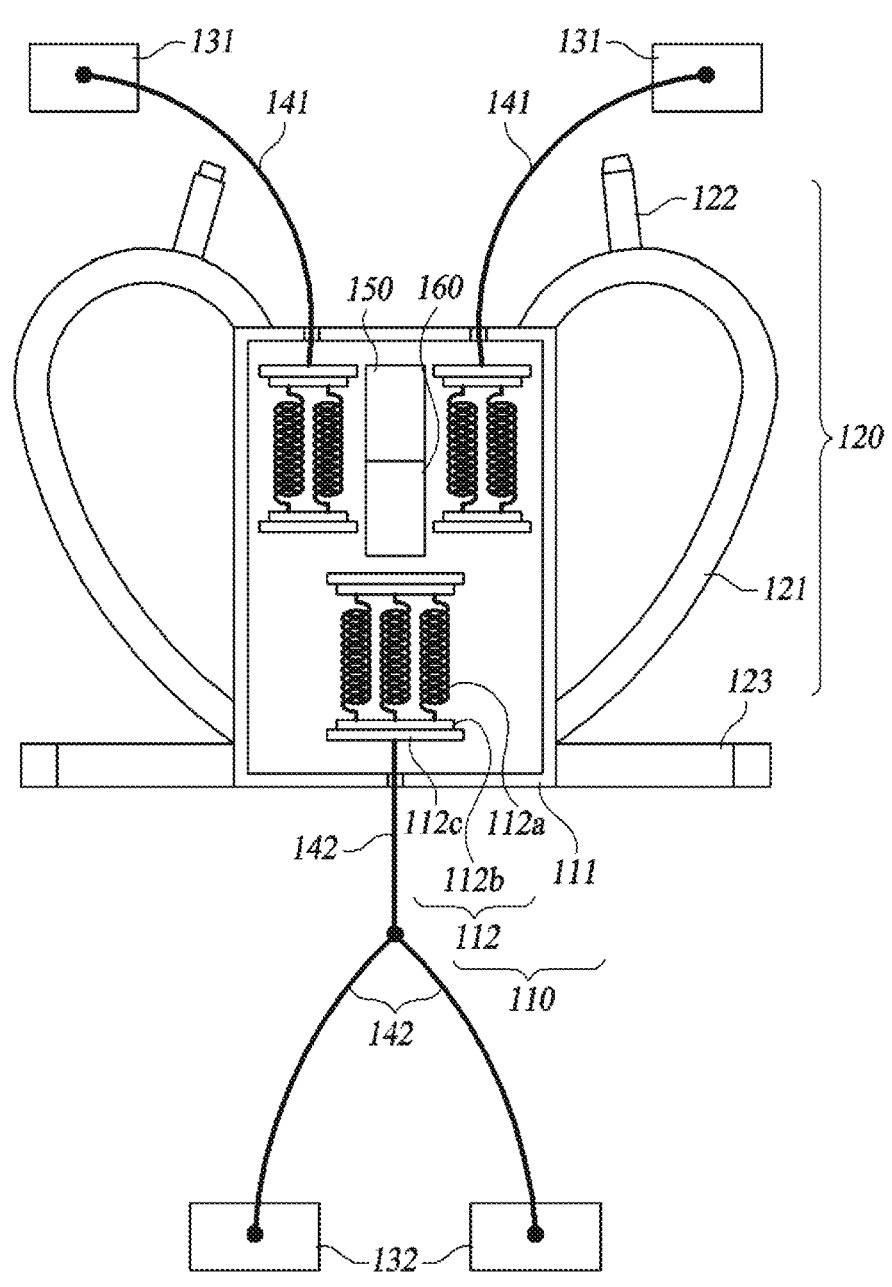
FIG. 1 is a view illustrating a configuration of a wearable suit according to one embodiment of the present disclosure.

100: wearable suit
110: body unit
120: fixing unit
130: coupling unit
140: connecting unit

DETAILED DESCRIPTION

A wearable suit according to one embodiment uses a muscular strength assistance unit formed of a shape memory alloy matt al to assist muscular strength of a user, thereby simplifying a structure, reducing weight, and removing noise caused by driving of a motor.

The object to be achieved by the present disclosure is not limited to the above-mentioned object, and other objectives not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a view illustrating a configuration of a wearable suit according to one embodiment of the present disclosure.

Figure 2:
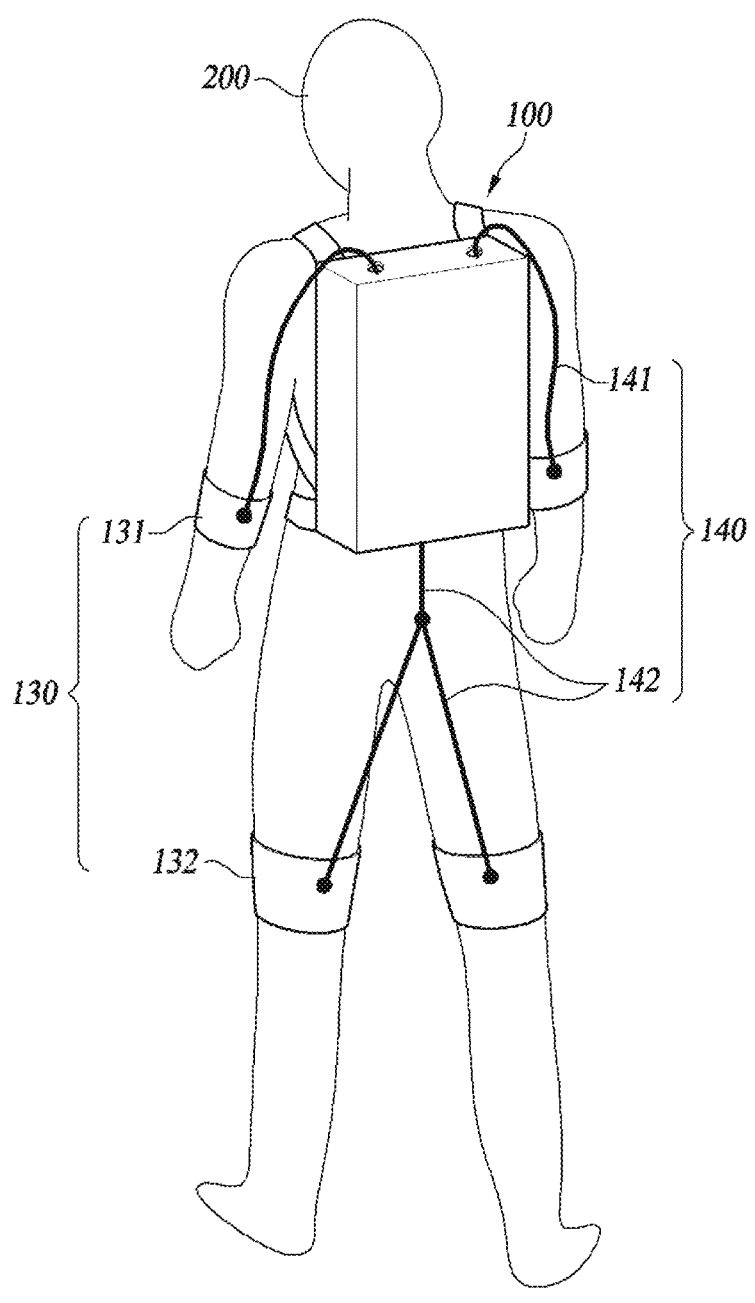
FIG. 2 is a view illustrating a state of a user wearing the wearable suit according to one embodiment of the present disclosure.

FIG. 2 is a view illustrating a state of a user wearing the wearable suit according to one embodiment of the present disclosure.

Figure 3:
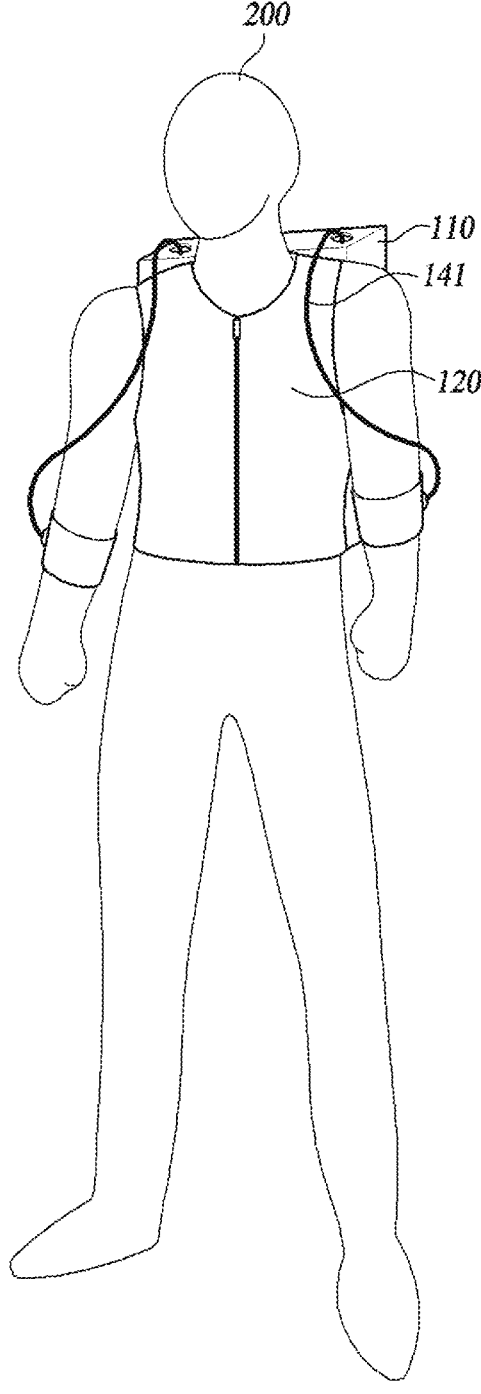
FIG. 3 is a view illustrating a fixing unit according to another embodiment of the present disclosure.

FIG. 3 is a view illustrating a fixing unit according to another embodiment of the present disclosure.

Figure 4:
FIG. 4 is a block diagram of the wearable suit according to one embodiment of the present disclosure.
Figure 4:
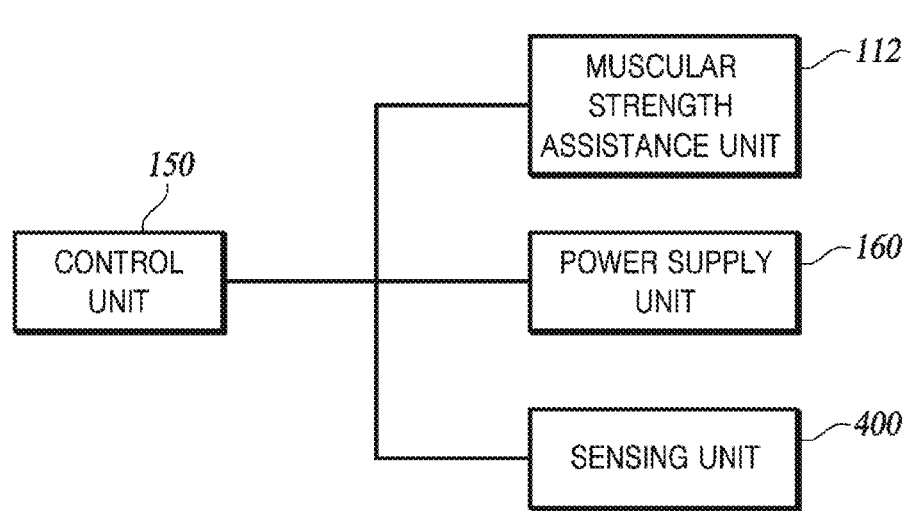

FIG. 4 is a block diagram of the wearable suit according to one embodiment of the present disclosure.

Referring to FIGS. 1 to 4, a wearable suit 100 according to one embodiment of the present disclosure may include a body unit 110, a fixing unit 120, a coupling unit 130, a connecting unit 140, a control unit 150, and a power supply unit 160.

The body unit 110 may include a housing 111 and a muscular strength assistance unit 112.

The muscular strength assistance unit 112 may include a muscular strength assistance spring 112*a*, a terminal 112*b*, and a supporting member 112*c*.

The fixing unit 120 may include a shoulder belt 121, a chest belt 122, and a waist belt 123.

The coupling unit 130 may include an arm coupling unit 131 and a leg coupling unit 132.

The connecting unit 140 may include an arm connecting unit 141 and a leg connecting unit 142.

The body unit 110 is disposed in at least a portion of an upper body of a user 200. The body unit 110 may be disposed at the rear of the upper body of the user 200. At least a portion of the body unit 110 is formed of a shape memory alloy material. The body unit 110 may be connected to at least a portion of the fixing unit 120. The body unit 110 may be connected to the shoulder belt 121 and the waist belt 123. The body unit 110 is connected to the connecting unit 140. The body unit 110 is connected to the coupling unit 130 using the connecting unit 140. The control unit 150 may control the body unit 110 so that the body unit 110 is activated or deactivated.

The housing 111 is disposed in at least a portion of the upper body of the user 200. The housing 111 may include an accommodation space therein. In the accommodation space inside the housing 111, at least a portion of the muscular strength assistance unit 112, the control unit 150, the power supply unit 160, a guiding unit (500, 600, 700, refer to FIGS. 5 to 7), and the connecting unit 140 may be disposed. The housing 111 and the shoulder belt 121 may be formed in a backpack shape.

The muscular strength assistance unit 112 is configured to assist the muscular strength of the user 200. The muscular strength assistance unit 112 may be disposed inside the housing 111. At least a portion of the muscular strength assistance unit 112 is formed of a shape memory alloy material. At least a portion of the muscular strength assistance unit 112 may be contracted and expanded. Power may be applied to the muscular strength assistance unit 112 by the power supply unit 160. At least a portion of the muscular strength assistance unit 112 is connected to the connecting unit 140. The muscular strength assistance unit 112 may be connected to the coupling unit 130 using a connecting unit 140. There may be a plurality of muscular strength assistance units 112. The muscular strength assistance unit 112 may be controlled by a control unit 150.

The muscular strength assistance spring 112*a* is formed of a shape memory alloy material. The muscular strength assistance spring 112*a* is configured to be contractible and expandable. The muscular strength assistance spring 112*a* may be disposed inside the housing 111. The muscular strength assistance spring 112*a* may be electrically connected to the terminal 112*b*. The muscular strength assistance spring 112*a* may be connected to the supporting member 112*c*. As the muscular strength assistance spring 112*a* is contracted or expanded, the terminal 112*b* and the supporting member 112*c* may move. In this way, compared to a case of driving only the motor, when the muscular strength assistance spring 112*a* is used as a driving source of the wearable suit 100, the weight of the wearable suit 100 can be reduced, and noise caused by the driving of the motor can be reduced.

The muscular strength assistance spring 112*a* may be contracted and expanded using the power supplied from the power supply unit 160. Heat is generated by the electric power applied to the muscular strength assistance spring 112*a* and electrical resistance of the muscular strength assistance spring 112*a*. As the temperature of the muscular strength assistance spring 112*a* increases, the muscular strength assistance spring 112*a* is contracted. As the electric power supplied to the muscular strength assistance spring 112*a* is cut off, the muscular strength assistance spring 112*a* may be cooled.

There may be a plurality of muscular strength assistance springs 112a. The plurality of muscular strength assistance springs 112a may be disposed in series and/or parallel to each other. In this case, the plurality of muscular strength assistance springs 112a may be disposed in an appropriate shape in consideration of the resistance of the muscular strength assistance spring 112a and power supplied from the power supply unit 160.

The terminal 112b may be formed on the supporting member 112c. The terminal 112b may be electrically connected to the muscular strength assistance spring 112a. The terminal 112b may be electrically connected to the power supply unit 160. The terminal 112b may transmit power supplied from the power supply unit 160 to the muscular strength assistance spring 112a. The terminal 112b may be connected to the muscular strength assistance spring 112a and/or the supporting member 112c. As the muscular strength assistance spring 112a is contracted or expanded, the terminal 112b may move together with the supporting member 112c. The terminal 112b may be disposed inside the housing 111.

The supporting member 112c is connected to the muscular strength assistance spring 112a and/or the terminal 112b to support the muscular strength assistance spring 112a and/or the terminal 112b. The supporting member 112c may be disposed on both sides of the muscular strength assistance spring 112a. The supporting member 112c may be disposed inside the housing 111. The terminal 112b may be formed on the supporting member 112c. There may be a plurality of supporting members 112c. Some of the plurality of supporting members 112c may be connected to the connecting unit 140. The supporting member 112c connected to the connecting unit 140 may move as the muscular strength assistance spring 112a is contracted or expanded to assist the muscular strength of the user 200. Other supporting members 112c of the plurality of supporting members 112c may be fixed to the inside of the housing 111. For example, at least some of the plurality of supporting members 112c connected to the connecting unit 140 may be movably installed with respect to the housing 111, and at least some not connected to the connecting unit 140 may be installed to be fixed to the housing 111.

The fixing unit 120 fixes the body unit 110 to the upper body of the user 200. At least a portion of the fixing unit 120 may be connected to the housing 111. The fixing unit 120 may include one or more of the shoulder belt 121, the chest belt 122, the waist belt 123, and the leg belt.

The shoulder belt 121 fixes the body unit 110 to the upper body of the user 200. When the user 200 wears the wearable suit 100, the shoulder belt 121 may be configured to surround the shoulder of the user 200. Both sides of the shoulder belt 121 may be connected to the housing 111. At least a portion of the chest belt 122 may be connected to the shoulder belt 121.

The chest belt 122 fixes the body unit 110 to the upper body of the user 200. When the user 200 wears the wearable suit 100, the chest belt 122 may be configured to surround the chest of the user 200. At least a portion of the chest belt 122 may be connected to the shoulder belt 121. A middle portion of the chest belt 122 may be formed in a structure capable of being coupled and detached.

The waist belt 123 fixes the body unit 110 to the upper body of the user 200. When the user 200 wears the wearable suit 100, the waist belt 123 may be configured to surround the waist of the user 200. Both sides of the waist belt 123 may be connected to the housing 111. A middle portion of the waist belt 123 may be formed in a structure that is coupled and detachable. According to the waist belt 123, it is possible to stably maintain a state in which the body unit 110 is positioned in the upper body of the user 200. Meanwhile, even when the waist belt 123 is not provided, the body unit 110 can be positioned at the upper body of the user 200 by a fixing force of the leg belt, which will be described later, or by the own weight and the shoulder belt 121 of the body unit 110.

The leg belt may fix the body unit 110 to the upper body of the user 200. When the wearable suit 100 assists the muscular strength of the arm of the user 200, the leg belt fixes the body unit 110 to the upper body of the user 200. In this case, the leg coupling unit 132 and the leg connecting unit 142 may serve as the leg belt. Meanwhile, when the wearable suit 100 assists only the arm of the user 200, the leg belt may be omitted.

For example, the fixing unit 120 may be provided in the form of a vest. In the fixing unit 120 in the form of a vest, it may be understood that two or more of the shoulder belt 121, the chest belt 122, and the waist belt 123 are integrally formed. For example, the fixing unit 120 may be formed in a shape in which the left and right shoulder belts 121 are interconnected by a fastening means, for example, a zipper or a button.

The coupling unit 130 is coupled to at least a portion of the body of the user 200. The coupling unit 130 may be coupled to at least a portion of the arm and/or leg of the user 200. The coupling unit 130 may be connected to the body unit 110 by the connecting unit 140. The coupling unit 130 may be connected to the muscular strength assistance unit 112 to assist the muscular strength of the user 200. There may be a plurality of coupling units 130. The coupling unit 130 may be formed in a band shape.

The arm coupling unit 131 is coupled to at least a portion of the arm of the user 200. The arm coupling unit 131 may be connected to the muscular strength assistance unit 112 by the arm connecting unit 141 and assist the muscular strength of the arm of the user 200.

The leg coupling unit 132 is coupled to at least a portion of the leg of the user 200. The leg coupling unit 132 may be connected to the muscular strength assistance unit 112 by the leg connecting unit 142, and may assist the muscular strength of the leg and/or the waist of the user 200. When the wearable suit 100 assists the muscular strength of the arm of the user 200, the leg coupling unit 132 may constitute a portion of the leg belt.

The connecting unit 140 connects the body unit 110 and the coupling unit 130 to each other. The connecting unit 140 connects the muscular strength assistance unit 112 and the coupling unit 130 to each other. At least a portion of the connecting unit 140 may move as the muscular strength assistance spring 112a is contracted or expanded. For example, the connecting unit 140 may be formed of a non-stretchable material. For example, at least a portion of the connecting unit 140 may be formed of a polyester material. A thickness of the connecting unit 140 may be 8 mm to 10 mm. At least a portion of the connecting unit 140 is inserted into the inside of the guiding member (500, 600, 700, refer to FIGS. 5 to 7), and thus, the position of the connecting unit 140 may be guided and/or fixed.

The arm connecting unit 141 connects the body unit 110 and the arm coupling unit 131 to each other. The arm connecting unit 141 connects the muscular strength assistance unit 112 and the arm coupling unit 131 to each other. As the muscular strength assistance spring 112a is contracted or expanded, at least a portion of the arm connecting unit 141 may move to assist the muscular strength of the arm of the user 200.

Meanwhile, when the wearable suit 100 is provided to assist the muscular strength of the leg and/or the waist of the user 200, the arm coupling unit 131 and the arm connecting unit 141 may be omitted.

The leg connecting unit 142 connects the body unit 110 and the leg coupling unit 132 to each other. The leg connecting unit 142 connects the muscular strength assistance unit 112 and the leg coupling unit 132 to each other. As the muscular strength assistance spring 112a is contracted or expanded, at least a portion of the leg connecting unit 142 may move to assist the muscular strength of the leg and/or the waist of the user 200. When the wearable suit 100 assists the muscular strength of the arm of the user 200, the leg connecting unit 142 may constitute a portion of the leg belt. The leg connecting unit 142 may be formed in a "Y" shape or an "H" shape. The leg connecting unit 142 may be formed integrally, but is not necessarily limited thereto, and may be formed in a shape in which a plurality of components are combined according to the purpose and use.

Meanwhile, when the wearable suit 100 is provided to assist the muscular strength of the arm of the user 200, the leg coupling unit 132 and the leg connecting unit 142 may be omitted.

The control unit 150 may control each configuration of the wearable suit 100. The control unit 150 may be disposed inside the housing 111. The control unit 150 may receive information acquired by a sensing unit 400. The control unit 150 may receive a signal related to operation or deactivation from a timer and/or a switch. The control unit 150 may control the power supply unit 160 based on information obtained by the sensing unit 400. The control unit 150 may control the body unit 110 using the power supply unit 160.

The control unit 150 may operate the wearable suit 100 based on an operation signal transmitted from a switch or the like. In this case, the control unit 150 may operate the wearable suit 100 by controlling the power supply unit 160 to supply power from the power supply unit 160 to the muscular strength assistance unit 112.

The control unit 150 may cancel the operation of the wearable suit 100 based on the information transmitted from a timer and/or the sensing unit 400. In this case, the control unit 150 controls the power supply unit 160 so that the power supplied from the power supply unit 160 to the muscular strength assistance unit 112 is cut off, thereby canceling the operation of the wearable suit 100. The control unit 150 may release the operation of the wearable suit 100 based on information transmitted from the timer. The control unit 150 may release the operation of the wearable suit 100 based on information on a load acting on the wearable suit 100. The control unit 150 may release the operation of the wearable suit 100 based on whether the load acting on the connecting unit 140 decreases and/or whether a load reduction time is equal to or longer than a preset time.

The power supply unit 160 may be electrically connected to at least a portion of the muscular strength assistance unit 12 to supply power to the muscular strength assistance unit 112. The power supply unit 160 may be electrically connected to the terminal 112b. The power supply unit 160 may be disposed inside the housing 111. Heat is generated by the electric power supplied from the power supply unit 160 and the electrical resistance of the muscular strength assistance spring 112a, and the temperature of the muscular strength assistance spring 112a increases. Accordingly, the muscular strength assistance spring 112a is contracted and provides tension to the connecting unit 140 to assist the muscular strength of the body part of the user equipped with the coupling unit 130, that is, the arm, waist and/or leg. The power supply unit 160 may be controlled by the control unit 150 to supply or cut power to the muscular strength assistance unit 112.

Figure 5:
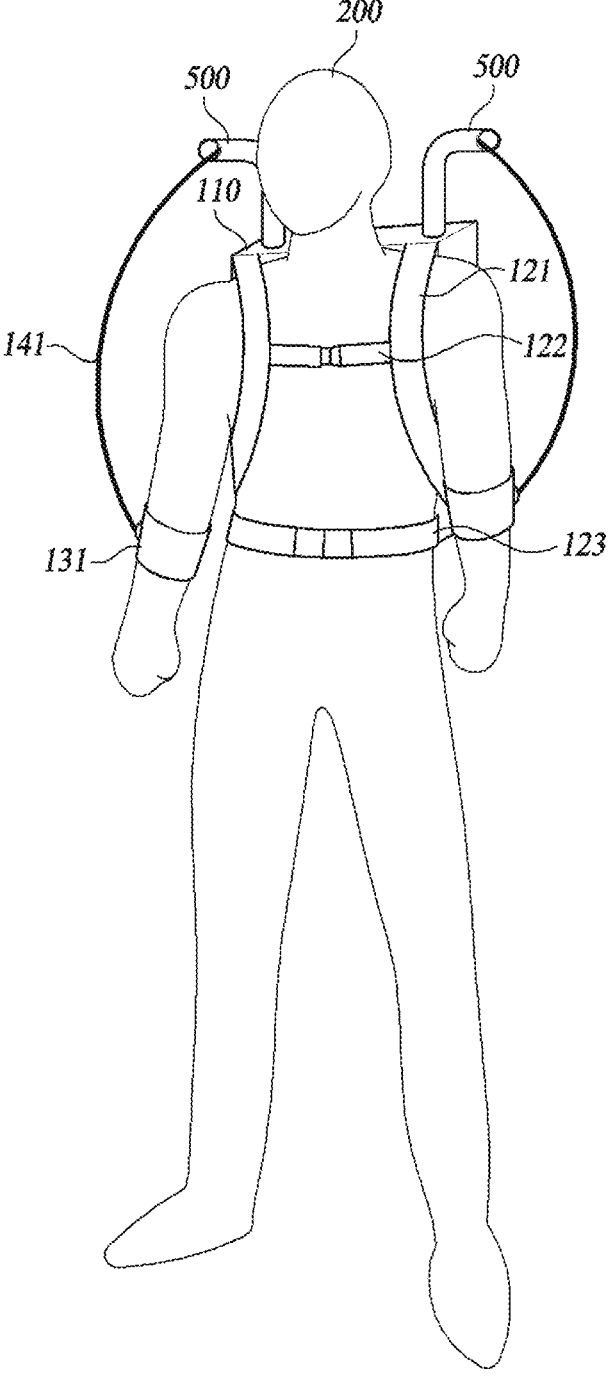
FIG. 5 is a view illustrating the wearable suit installed with a first guiding member according to one embodiment of the present disclosure.

FIG. 5 is a view illustrating the wearable suit installed with a first guiding member according to one embodiment of the present disclosure.

Figure 6:
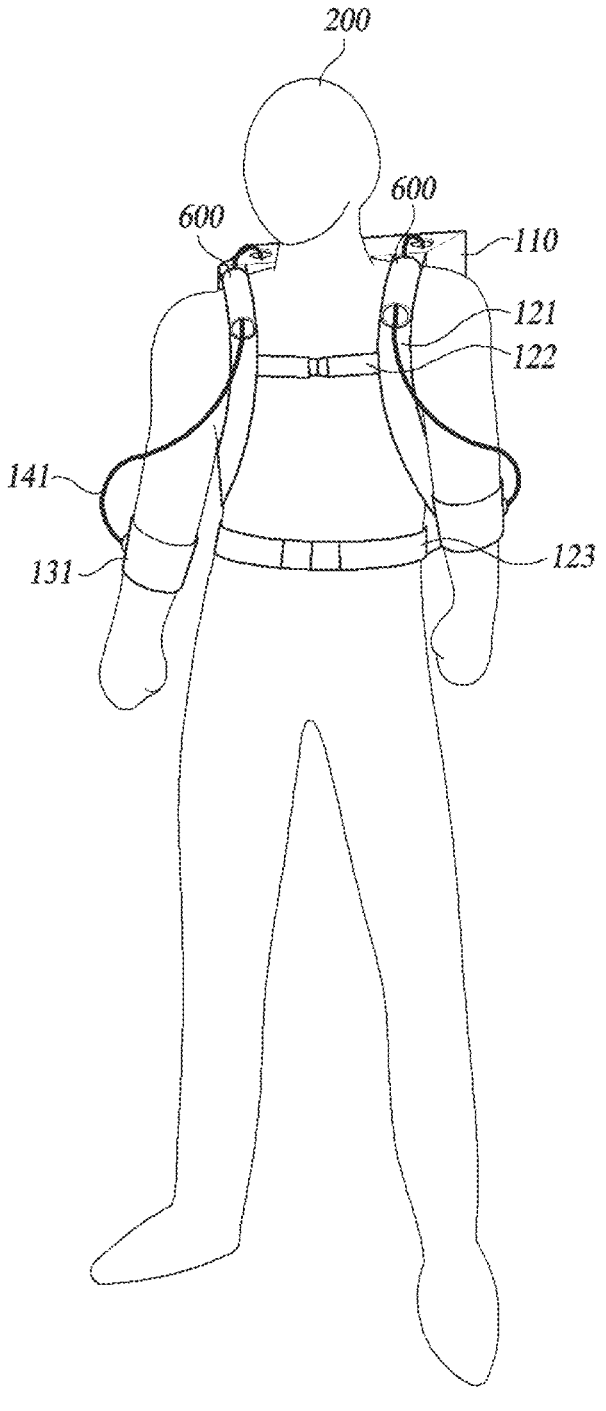
FIG. 6 is a view illustrating the wearable suit installed with a second guiding member according to one embodiment of the present disclosure.

FIG. 6 is a view illustrating the wearable suit installed with a second guiding member according to one embodiment of the present disclosure.

Figure 7:
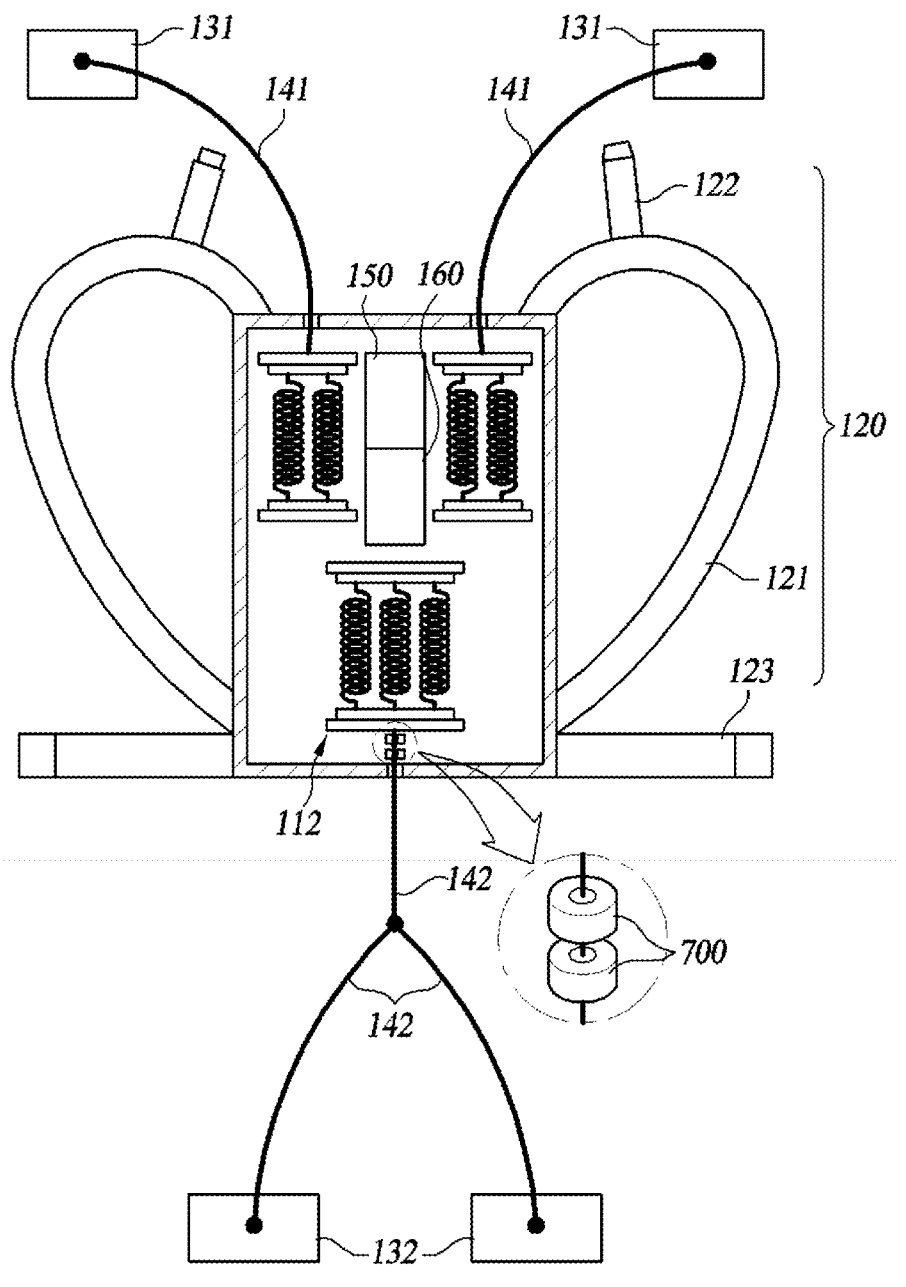
FIG. 7 is a view illustrating the wearable suit installed with a third guiding member according to one embodiment of the present disclosure.

FIG. 7 is a view illustrating the wearable suit installed with a third guiding member according to one embodiment of the present disclosure.

The guiding unit according to one embodiment of the present disclosure will be described in detail with reference to FIGS. 5 to 7.

The wearable suit 100 according to the present disclosure may further include the guiding unit configured to guide the position of the connecting unit 140. The guiding unit allows the connecting unit 140 to move along a set path, and thus, it is possible to further improve control accuracy.

The guiding unit may include one or more guiding members 500, 600, and 700 configured to be inserted into at least a portion of the connecting unit 140.

The guiding members 500, 600, and 700 may include a first guiding member 500, a second guiding member 600, and a third guiding member 700. FIG. 5 to 7 illustrate each of the guiding members 500, 600, and 700 by way of example, but, those of ordinary skill in the art will understand that the wearable suit 100 may include two or more guiding members 500, 600, and 700 together.

The first guiding member 500 may guide and/or fix the position of the arm connecting unit 141. The first guiding member 500 is configured to accommodate at least a portion of the arm connecting unit 141. The first guiding member 500 prevents the arm connecting unit 141 from coming into direct contact with the body of the user, and thus, it is possible to reduce the problem that the user is injured in the process of the arm connecting unit 141 moving. One side of the first guiding member 500 toward the upper side and/or the front of the user from the housing 111 may be connected to the housing 111. For example, as illustrated in FIG. 5, based on the state in which the user wears the wearable suit 100, the first guiding member 500 may have a shape extending from the housing 111 toward the upper side and/or the front of the user. Based on the state in which the user 200 wears the wearable suit 100, one portion of the first guiding member 500 may extend from the housing 111 toward the upper side of the user 200, and the remaining portion of the first guiding member 500 may extend in a direction toward the front of the user 200 from the one portion. According to the first guiding member 500, it is possible to prevent a load due to the tension applied to the arm connecting unit 141 from concentrating on the shoulder of the user. The first guiding member 500 may be formed in a pipe shape having a hollow into which at least a portion of the arm connecting unit 141 is inserted. According to such a shape, it is possible to guide the position of the arm connecting unit 141 more stably. Meanwhile, unlike this, the first guiding member 500 may have a groove shape with an open upper side. At least a portion of the first guiding member 500 may be bent so that the load acting on the first guiding member 500 and the arm connecting unit 141 is distributed. There may be a plurality of first guiding members 500.

For example, an end of the first guiding member 500 may have a downwardly curved shape. According to such a shape, it is possible to prevent the arm connecting unit 141 from being damaged by friction with the end portion of the first guiding member 500.

The second guiding member 600 may guide and/or fix the position of the arm connecting unit 141. The second guiding member 600 is configured to accommodate at least a portion of the arm connecting unit 141. The second guiding member 600 may be coupled to at least a portion of the fixing unit 120. The second guiding member 600 may be coupled to at least a portion of the shoulder belt 121. For example, the second guiding member 600 may be formed integrally with the fixing unit 120 (for example, shoulder belt 121) in the form of a passage formed to pass through the fixing unit 120 (for example, shoulder belt 121). The second guiding member 600 may be formed in a pipe or ring shape. Meanwhile, unlike this, the second guiding member 600 may have a groove shape with an open upper side. At least a portion of the second guiding member 600 may be bent so that the load acting on the second guiding member 600 is distributed. There may be a plurality of second guiding members 600.

The third guiding member 700 may guide and/or fix the position of the leg connecting unit 142. The third guiding member 700 is configured such that at least a portion of the leg connecting unit 142 is inserted. The third guiding member 700 may be disposed inside the housing 111. The third guiding member 700 may be fixed to the inside of the housing 111. The third guiding member 700 may be formed in a pipe or ring shape. There may be a plurality of third guiding members 700.

Figure 8A:
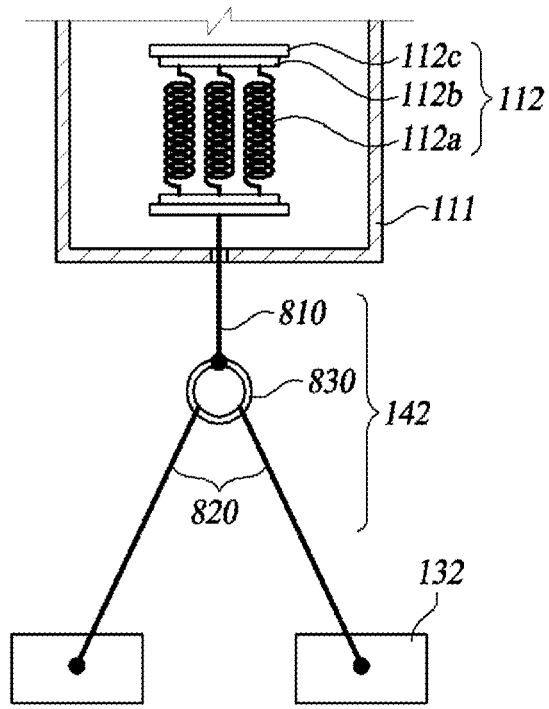
FIGS. 8A and 8B are views illustrating several embodiments of a leg connecting unit according to the present disclosure.
Figure 8B:
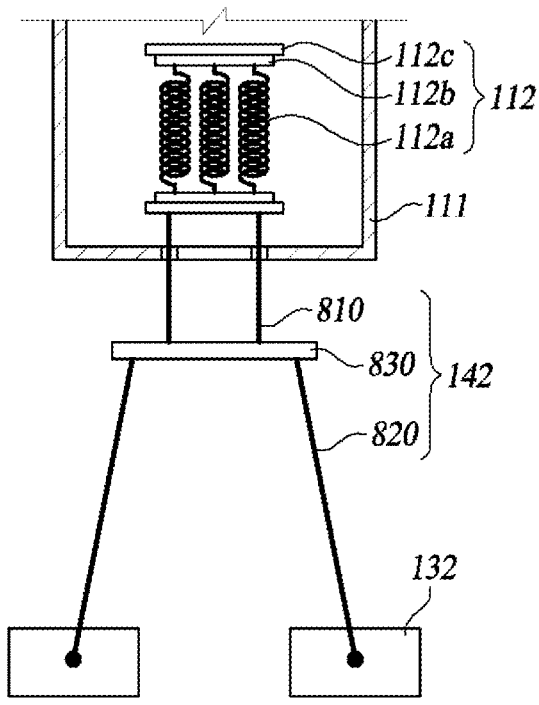

FIGS. 8A and 8B are views illustrating several embodiments of the leg connecting unit according to the present disclosure.

Referring to FIGS. 8A and 8B, the leg connecting unit 142 according to one embodiment of the present disclosure may include a first leg connecting unit 810, a second leg connecting unit 820 and a third leg connecting unit 830.

One side of the first leg connecting unit 810 is connected to the body unit 110. One side of the first leg connecting unit 810 may be connected to the supporting member 112c of the muscular strength assistance unit 112. As the muscular strength assistance spring 112a is contracted or expanded, at least a portion of the first leg connecting unit 810 may move together with the supporting member 112c. The other side of the first leg connecting unit 810 may be connected to the third leg connecting unit 830. The first leg connecting unit 810 may be connected to the second leg connecting unit 820 by the third leg connecting unit 830. A cross-section of the first leg connecting unit 810 may have a circular shape. The first leg connecting unit 810 may be formed of a polyester material. There may be a plurality of first leg connecting unit 810. According to the purpose and use, the first leg connecting unit 810 may be formed in various lengths.

One side of the second leg connecting unit 820 is connected to the leg coupling unit 132. The other side of the second leg connecting unit 820 may be connected to the third leg connecting unit 830. The second leg connecting unit 820 may be connected to the first leg connecting unit 810 by the third leg connecting unit 830. The second leg connecting unit 820 may be formed of a polyester material. The second leg connecting unit 820 may have a shape having a width larger than a thickness. According to such a shape, based on the state in which the user is seated in a chair for rest, by thinning a thickness of a portion of the leg connecting unit 142 in contact with the body (for example, waist, buttocks, and/or thigh) of the user, it is possible to sufficiently secure the rigidity of the second leg connecting unit 820 while relieving the discomfort during seating. For example, the second leg connecting unit 820 may be formed in a thin and flat shape (for example, a webbing belt shape) similar to a seat belt of a vehicle. There may be a plurality of second leg connecting unit 820. According to the purpose and use, the second leg connecting unit 820 may be formed in various lengths.

The third leg connecting unit 830 is disposed between the first leg connecting unit 810 and the second leg connecting unit 820. The third leg connecting unit 830 connects the other side of the first leg connecting unit 810 and the other side of the second leg connecting unit 820 to each other. The third leg connecting unit 830 may support and/or fix the first leg connecting unit 810 and the second leg connecting unit 820. The third leg connecting unit 830 may be formed in a ring or bar shape.

For example, as illustrated in FIG. 8A, when the third leg connecting unit 830 is formed in a ring shape, according to such a structure, the structure is simple, and it is possible to improve a right-left balance of the second leg connecting unit 820. For example, the second leg connecting unit 820 may be installed in the third leg connecting unit 830 to be movable along a periphery of the third leg connecting unit 830.

For example, as illustrated in FIG. 8B, when the third leg connecting unit 830 is formed in a bar shape, by sufficiently separating a distance between the pair of second leg connecting unit 820, it is possible to reduce a portion of the second leg connecting unit 820 in contact with the buttocks of the user. In addition, by reducing an angle formed by the second leg connecting unit 820 in a transmission direction of the force from the muscular strength assistance unit 112 to the leg coupling unit 132, it is possible to improve efficiency of force transmission.

Figure 9A:
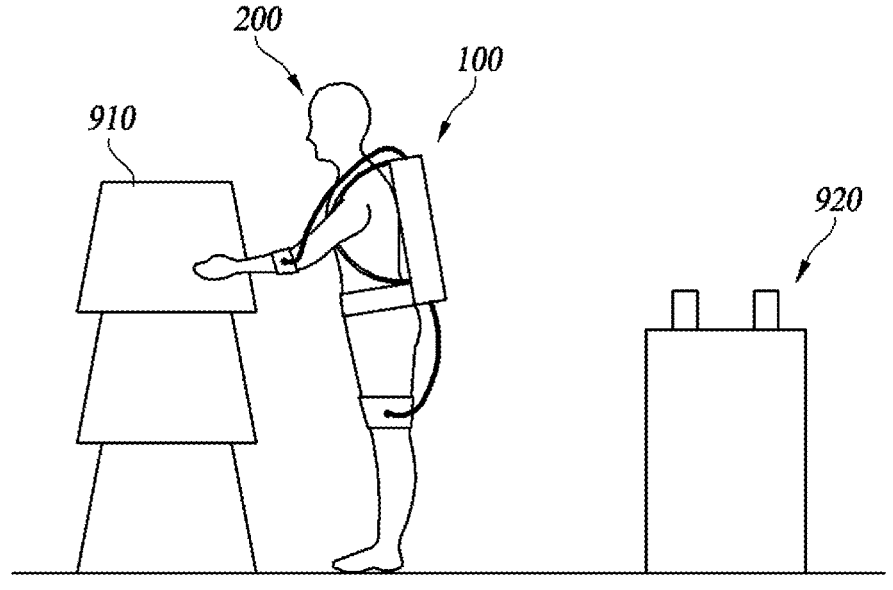
FIGS. 9A and 9B are views illustrating an operating principle of the wearable suit according to one embodiment of the present disclosure.
Figure 9B:
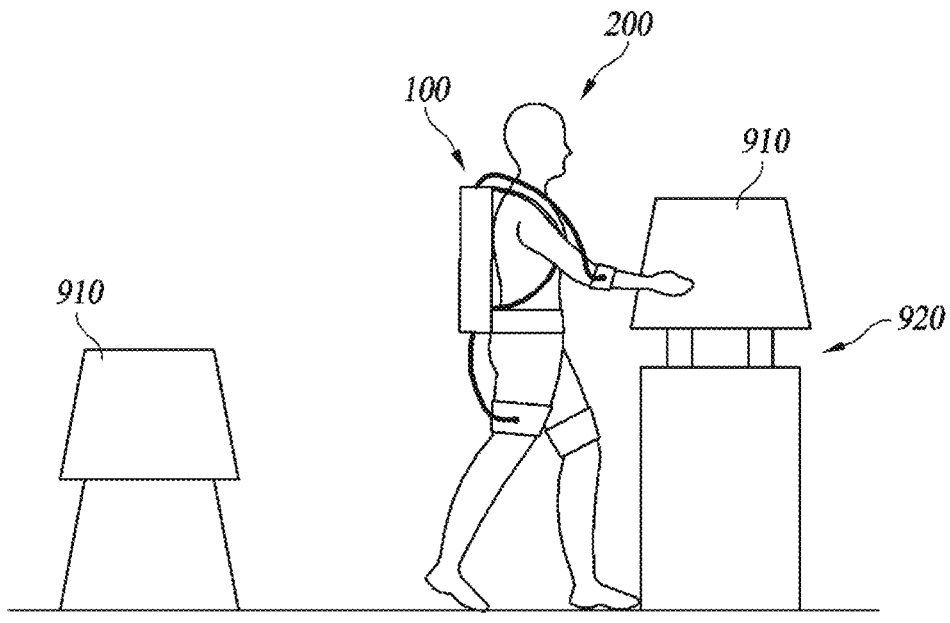

FIGS. 9A and 9B are views illustrating an operating principle of the wearable suit according to one embodiment of the present disclosure.

Figure 10A:
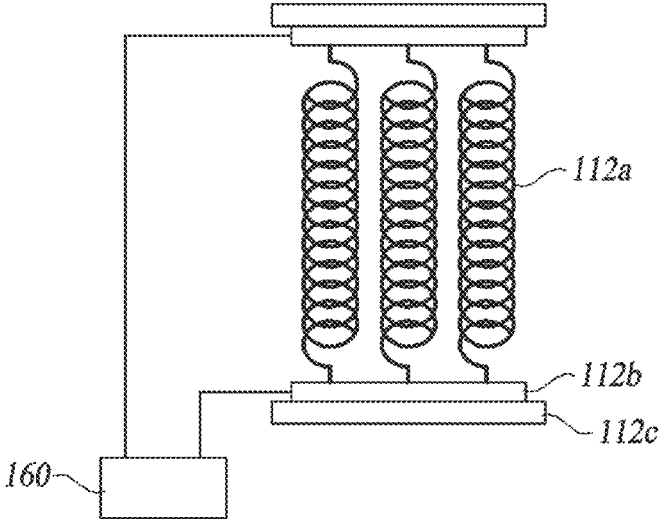
FIGS. 10A and 10B are views illustrating an operating principle of a muscular strength assistance unit according to one embodiment of the present disclosure.
Figure 10B:
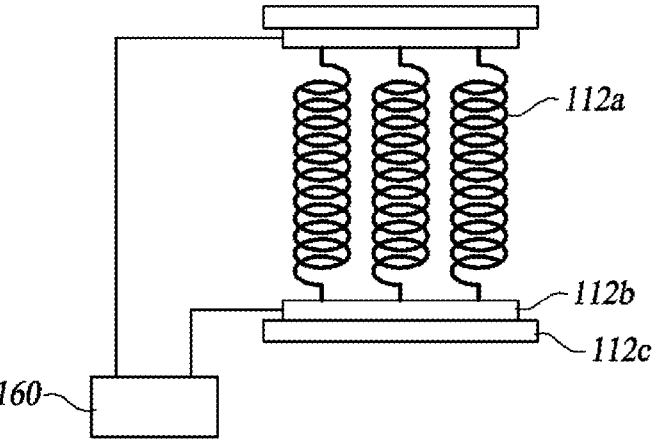

FIGS. 10A and 10B are views illustrating an operating principle of the muscular strength assistance unit according to one embodiment of the present disclosure.

The operating principle of the wearable suit 100 according to one embodiment of the present disclosure will be described with reference to FIGS. 9A to 10B.

The user 200 wearing the wearable suit 100 approaches the weight 910 to move a weight 910 to a work table 920. The user 200 may extend the arm or bend the waist to lift the weight 910. Accordingly, the muscular strength assistance spring 112a formed of the shape memory alloy material is expanded. The user 200 may transmit an operation signal of the wearable suit 100 to the control unit 150 using a switch or the like. The control unit 150 controls the power supply unit 160 so that power is supplied from the power supply unit 160 to the muscular strength assistance unit 112. Heat is generated by electric power supplied from the power supply unit 160 and the electrical resistance of the muscular strength assistance spring 112a. The temperature of the muscular strength assistance spring 112a increases and the muscular strength assistance spring 112a is contracted. As the muscular strength assistance spring 112a is contracted, it is possible to assist the muscular strength of the body of the user connected to the muscular strength assistance unit 112. As a result, the user 200 may move the weight 910 to the work table 920 with a small force.

Figure 11A:
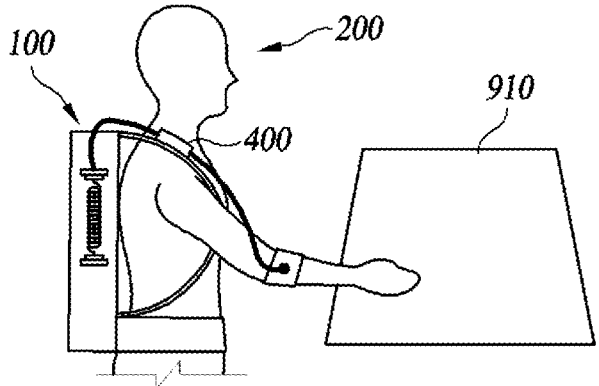
FIGS. 11A, 11B and 11C are views illustrating an operating principle of a sensing unit according to one embodiment of the present disclosure.
Figure 11B:
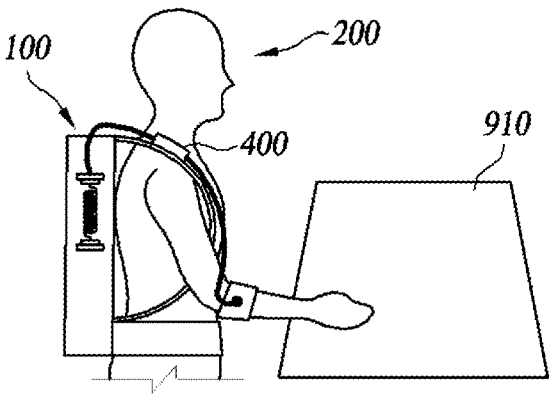
Figure 11C:
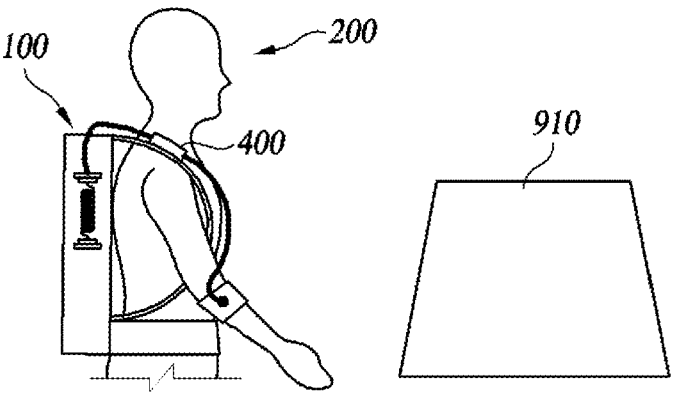

FIGS. 11A to 11C are views illustrating an operating principle of the sensing unit according to one embodiment of the present disclosure.

Referring to FIG. 11, the wearable suit 100 according to one embodiment of the present disclosure may further include the sensing unit 400.

The sensing unit 400 senses a load acting on the wearable suit 100. The sensing unit 400 may transmit the acquired information to the control unit 150. The control unit 150 may control the wearable suit 100 based on the information acquired by the sensing unit. The sensing unit 400 may include one or more load sensors. The sensing unit 400 may be disposed on the connecting unit 140 to sense a load acting on the connecting unit 140. The sensing unit 400 may sense the tension acting on the connecting unit 140. The sensing unit 400 may be disposed in the middle of the connecting unit 140.

The sensing unit 400 may be disposed on the connecting unit 140 to detect loads acting on the connecting units 140 on both sides, respectively. As the user 200 extends the arm or bends the waist to move the weight 910, the muscular strength assistance spring 112a is expanded, and the connecting units 140 on both sides of the sensing unit 400 maintain a loose state. As the user 200 operates the wearable suit 100 to lift the weight 910, the muscular strength assistance spring 112a is contracted, and both connecting units 140 on both sides of the sensing unit 400 are tense. When the user 200 puts down the weight 910 from his/her hand, the load acting on the connecting unit 140 between the sensing unit 400 and the coupling unit 130 is reduced. The sensing unit 400 transmits information on the load acting on the connecting unit 140 to the control unit 150, and the control unit 150 releases the operation of the wearable suit 100 based on the information. When the user 200 is holding an object in both hands, there is a problem in that it is difficult to use the switch. However, according to the above-described structure, it is possible to release the operation of the wearable suit 100 according to the intention of the user 200 without a separately installed switch or the like.

According to one embodiment, the wearable suit uses a muscular strength assistance unit formed of the shape memory alloy material to assist muscular strength of the user, thereby simplifying the structure, reducing weight, and removing noise caused by driving of a motor. Further, various reference elements mentioned above may be alternatively identified. As non-limiting examples, the body unit 110 may be identified simply as a body or main body, the muscular strength assistance unit 112 may be identified as a muscular strength enhancer, the fixing unit 120 may be identified as a harness, various coupling units 130, 131, 132, 140, 141, 142, 810, 820, 830 may be identified as corresponding couplers, the control unit 150 may be identified as a controller, the power supply unit 160 may be identified as a power supply, the sensing unit 400 may be identified as a sensor, and various guide units 500, 600, 700, 910 may be identified as corresponding guides. Additionally, a shape memory alloy material (or shape memory alloy) refers to one or more shape memory alloys (SMAs) that are materials that can return to their original shape after being deformed.

Various implementations of the systems and techniques described herein may be realized by a digital electronic circuit, an integrated circuit, a field programmable gate array (FPGA), an application specific integrated circuit (ASIC), computer hardware, firmware, software, and/or a combination thereof. These various implementations may include being implemented in one or more computer programs executable on a programmable system. The programmable system includes at least one programmable processor (which may be a special purpose processor or may be a general-purpose processor) coupled to receive data and instructions from, and transmit data and instructions to, a storage system, at least one input device, and at least one output device. Computer programs (also known as programs, software, software applications or code) include instructions for a programmable processor and are stored on a "computer-readable medium".

The computer-readable recording medium includes all types of recording devices in which data readable by a computer system is stored. These computer-readable recording media may be non-volatile or non-transitory medium, such as ROM, CD-ROM, magnetic tape, floppy disk, memory card, hard disk, magneto-optical disk, and storage device, and may further include a transitory medium such as a data transmission medium. In addition, the computer-readable recording medium may be distributed in a network-connected computer system, and the computer-readable code may be stored and executed in a distributed manner.

Various implementations of the systems and techniques described herein may be implemented by a programmable computer. Here, the computer includes a programmable processor, a data storage system (including volatile memory, non-volatile memory, or other types of storage systems or combinations thereof) and at least one communication interface. For example, a programmable computer may be one of a server, a network appliance, a set-top box, an embedded device, a computer expansion module, a personal computer, a laptop, a Personal Data Assistant (PDA), a cloud computing system, or a mobile device.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A wearable suit for increasing muscular strength of a user, the wearable suit comprising:
   a body;
   a harness configured to fix the body unit to an upper body of the user;
   a pair of arm couplers configured to be respectively coupled to a portion of each of the arms of the user;
   a pair of arm connectors configured to respectively connect the body and the of arm couplers to each other;
   a pair of leg couplers configured to be respectively coupled to a portion of each of the legs of the user; and
   a leg connector configured to connect the body and the leg couplers to each other,
   wherein the body comprises:
      a housing defining an accommodating space therein; and
      a plurality of muscular strength assistance units disposed inside the housing,
      wherein each of the plurality of muscular strength assistance units comprises:
         at least one muscular strength assistance spring comprises a shape memory alloy;
         a terminal electrically connected to the at least one muscular strength assistance spring; and a supporting member configured to support the at least one muscular strength assistance spring and the terminal, wherein the plurality of muscular strength assistance units comprise:

a first muscular strength assistance unit and a second muscular strength assistance unit respectively connected to the arm connectors and disposed in an upper portion of the housing and spaced apart from each other in a lateral direction perpendicular to an expansion direction of the at least one muscular strength assistance spring; and a third muscular strength assistance unit connected to the leg connector and disposed in a lower portion of the housing and centered in the lateral direction of the housing, and spaced apart relative to the first and second muscular strength assistance units along a direction parallel to the expansion direction of the at least one muscular strength assistance spring, wherein the first muscular strength assistance unit, the second muscular strength assistance unit, and the third muscular strength assistance unit are physically separated from each other, and wherein the first muscular strength assistance unit and the second muscular strength assistance unit each consists of a connection to a respective one of the pair of arm connectors and are configured to individually assist movement of the respective arms of the user, and the third muscular strength assistance unit consists of a connection to the leg connector and is configured to assist movement of the legs of the user.

2. The wearable suit of claim 1, further comprising a guide configured to guide a position of each of the pair of arm connectors.

3. The wearable suit of claim 2, wherein the guide comprises a guiding member configured to accommodate at least a portion of each of the pair of arm connectors.

4. The wearable suit of claim 3, wherein the guiding member comprises a first guiding member, wherein the first guiding member includes a side connected to the housing and wherein the first guiding member receives at least a portion of each of the pair of arm connectors.

5. The wearable suit of claim 4, wherein in a state in which the user wears the wearable suit, one portion of the first guiding member extends in a direction toward an upper side of the user from the housing of the body, and a remaining portion of the first guiding member extends in a direction from the one portion of the first guiding member toward a front of the user.

6. The wearable suit of claim 3, wherein the guiding member further comprises a second guiding member having a portion coupled to the harness, and wherein the guiding member receives at least a portion of each of the pair of arm connectors.

7. The wearable suit of claim 6, wherein the second guiding member is integral with at least a portion of the harness.

8. The wearable suit of claim 3, wherein at least a portion of the at least one guiding member is curved.

9. The wearable suit of claim 1, wherein the harness comprises one or more of a shoulder belt, a chest belt, a waist belt, and a leg belt.

10. The wearable suit of claim 1, wherein the harness is vest shaped.

11. The wearable suit of claim 1, wherein the at least one muscular strength assistance spring comprises two or more muscular strength assistance springs, and wherein the two or more muscular strength assistance springs are disposed in a series form or in a parallel form.

12. The wearable suit of claim 1, further comprising a power supply unit configured to supply power to each of the plurality of muscular strength assistance units, wherein at least a portion of each of the plurality of muscular strength assistance units is expanded and contracted based on the power.

13. The wearable suit of claim 6, further comprising a third guiding member configured to position the leg connector.

* * * * *